United States Patent [19]

Hisatomi et al.

[11] Patent Number: 5,059,498
[45] Date of Patent: Oct. 22, 1991

[54] INORGANIC NONAQUEOUS ELECTROLYTIC SOLUTION TYPE CELL

[75] Inventors: Kaoru Hisatomi; Hiroshi Sasama, both of Takatsuki; Kazuo Ishida; Shintaro Sekido, both of Suita, all of Japan

[73] Assignee: Hitachi Maxell, Ltd., Osaka, Japan

[21] Appl. No.: 538,745

[22] Filed: Jun. 15, 1990

[30] Foreign Application Priority Data

Jun. 16, 1989 [JP] Japan .................. 1-155500
Jun. 16, 1989 [JP] Japan .................. 1-155501

[51] Int. Cl.$^5$ .................. H01M 8/02; H01M 2/16
[52] U.S. Cl. .................. 429/196; 429/145
[58] Field of Search .............. 429/144, 145, 194, 196, 429/101, 198

[56] References Cited

U.S. PATENT DOCUMENTS

| | | | |
|---|---|---|---|
| 2,511,887 | 6/1950 | Vinal | 429/144 |
| 3,159,507 | 12/1964 | Abbe et al. | 429/145 |
| 4,288,503 | 9/1981 | Goldberg | 429/145 |
| 4,361,632 | 11/1982 | Weber et al. | 429/145 |
| 4,401,732 | 8/1983 | Hamilton | 429/196 X |
| 4,421,834 | 12/1983 | Zupancic | 429/196 X |
| 4,650,730 | 3/1987 | Lundquist et al. | 429/145 X |
| 4,663,252 | 5/1987 | Chenebault et al. | 429/196 X |
| 4,812,375 | 3/1989 | Foster | 429/101 |
| 4,888,255 | 12/1989 | Yoshimitsu et al. | 429/101 |

*Primary Examiner*—Anthony Skapars
*Attorney, Agent, or Firm*—Birch, Stewart, Kolasch & Birch

[57] ABSTRACT

An inorganic nonaqueous electrolytic solution type cell comprising an oxyhalide which is in the liquid state at room temperature and serves as an active material for a positive electrode and as a solvent for an electrolytic solution; a negative electrode made of an alkali metal; a positive electrode made of a porous carbon molded article; and a separator which is positioned between said negative electrode and said positive electrode and comprises a nonwoven fabric of glass fibers and a microporous film having a substantially uniform micropores having curved passages, which cell suffers less decrease of closing voltage after storage and less formation of the internal short circuits due to vibration.

9 Claims, 3 Drawing Sheets

FIG. I
PRIOR ART

INORGANIC NONAQUEOUS ELECTROLYTIC SOLUTION TYPE CELL

BACKGROUND OF THE INVENTION

1. Field of the Invention

The present invention relates to an inorganic nonaqueous electrolytic solution type cell comprising an oxyhalide which serves as an active material for positive electrode and also as a solvent for an electrolytic solution.

2. Description of the Related Art

An inorganic nonaqueous electrolytic solution type cell, which comprises an oxyhalide (e.g. thionyl chloride, sulfuryl chloride and phosphoryl chloride) as an active material for positive electrode, an alkali metal as a negative electrode, a porous carbon molded article as a positive electrode and in which the oxyhalide serves as a solvent for an electrolytic solution, has a large energy density and works at a lower temperature. However, since the oxyhalide has strong oxidation activity, a separator should be resistant to the strong oxidation activity of the oxyhalide.

For this reason, in the inorganic nonaqueous electrolytic solution type cell, vinylon-rayon mixed paper or vinylon paper which is used in an alkali cell cannot be used as a separator, and a nonwoven fabric of glass fibers having good oxidation resistance is used (cf. Japanese Patent Kokai Publication No. 121563/1983).

Since the nonwoven glass fiber fabric is not oxidized with the oxyhalide, it is stable in the electrolytic solution and has a long life. However, since the glass fibers have no inherent adhesivity and are bound through entanglement among them, the nonwoven glass fiber fabric has small mechanical strength such as tensile strength. Therefore, the separator made of nonwoven fabric tends to be broken during assembling of the cell and induces internal short circuits.

To increase the mechanical strength of the nonwoven glass fiber fabric, an organic binder resin such as polyethyl acrylate is mixed with the glass fibers when the nonwoven fabric is produced.

When the cell comprising the separator made of the nonwoven glass fiber fabric is stored for a long time or at a high temperature, the organic binder in the nonwoven fabric is gradually dissolved in the electrolytic solution so that the separator loses its strength and cannot maintain its shape. As the result, the separator has irregular thickness and thinner parts of the separator have decreased ability for retaining the electrolytic solution. Then, it becomes difficult for the alkali metal to migrate from the negative electrode to the positive electrode through the thinner parts of the separator, whereby a closing voltage of the cell decreases and in some cases, the short circuits are formed at the thinner parts of the separator.

To avoid the above problems, it may be contemplated to use a porous resin separator having good oxidation resistance and electrolytic solution-retaining ability. Examples of such porous resin film are a microporous film of ethylene-tetrafluoroethylene (ETFE) copolymer or polytetrafluoroethylene (PTFE).

When the PTFE microporous film as such is used as the separator in the cell, fluorine atoms in the polytetrafluoroethylene film react with the alkali metal of the negative electrode such as lithium and the film loses functions as the separator.

Since the pores in the ETFE or PTFE microporous film are uniform micropores and have complicatedly curved passages. Therefore, such pores are favorable for preventing migration of carbon particles but has smaller electrolytic solution-retaining ability than the nonwoven glass fiber fabric since the pores in the ETFE or PTFE porous film are not three-dimensional pores. Therefore, the amount of the electrolytic solution retained in the separator is insufficient so that sufficient discharge performance of the cell is not achieved.

SUMMARY OF THE PRESENT INVENTION

One object of the present invention is to provide an inorganic nonaqueous electrolytic solution type cell which can prevent decrease of a closing voltage during storage and formation of internal short circuits caused by vibration.

Another object of the present invention is to provide an inorganic nonaqueous electrolytic solution type cell having a separator which comprises a microporous film having good oxidation resistance and ability to prevent migration of carbon particles and can compensate small reactivity with the negative electrode when the PTFE microporous film is used or a small ability of the PTFE or ETFE microporous film for retaining the electrolytic solution.

Accordingly, the present invention provides an inorganic nonaqueous electrolytic solution type cell comprising:

an oxyhalide which is in the liquid state at room temperature and serves as an active material for a positive electrode and as a solvent for an electrolytic solution;

a negative electrode made of an alkali metal;

a positive electrode made of a porous carbon molded article; and a separator which is positioned between said negative electrode and said positive electrode and comprises a nonwoven fabric of glass fibers and a microporous film having a substantially uniform micropores having curved passages.

The microporous film is preferably a microporous film of a fluororesin, which has good oxidation resistance and is not oxidized with the oxyhalide. Since the fluororesin microporous film contains no organic binder as in case of the nonwoven glass fiber fabric, the strength of the separator does not decrease when the cell is stored for a long time or at high temperature, so that the separator keeps its shape and retains the electrolyte, and therefore the decrease of closing voltage can be prevented.

Since the microporous film has substantially uniform micropores the passages of which curves complicatedly, the carbon particles cannot or can hardly pass through the micropores. Therefore, when the cell is vibrated, migration of the carbon particles towards the negative electrode side is prevented by the separator and the short circuits due to migration of the carbon particles are not formed.

DETAILED DESCRIPTION OF THE INVENTION

Figure 1:
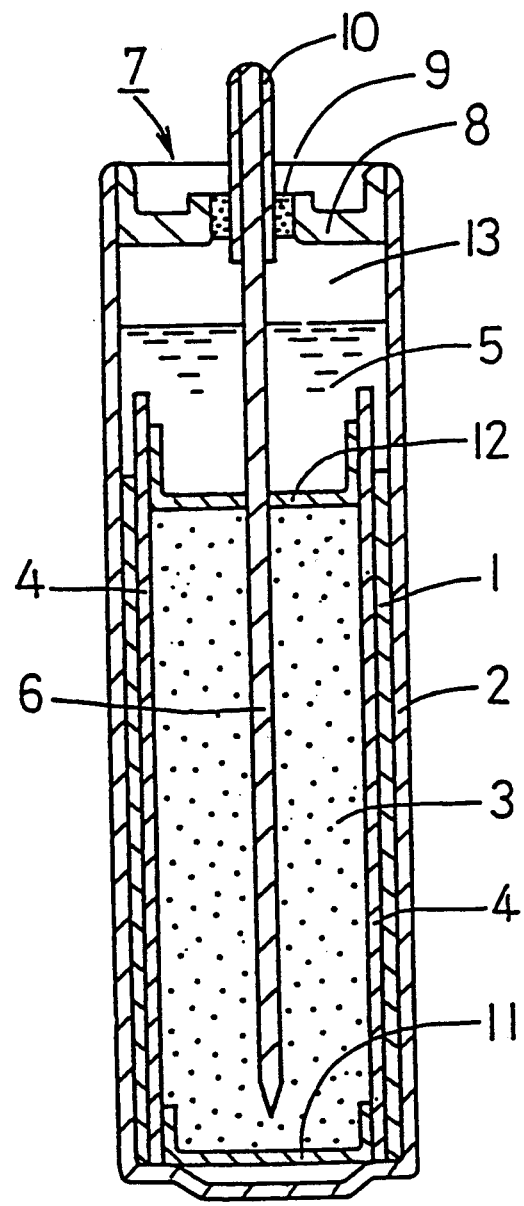
FIG. 1 is a cross section of a conventional inorganic nonaqueous electrolytic solution type cell.

As the microporous film, a microporous film made of a fluororesin is preferably used. Examples of the fluororesin are homo- or co-polymers of tetrafluoroethylene. Among them, polytetrafluoroethylene (PTFE) and ethylenetetrafluoroethylene copolymer (ETFE) are preferred.

The microporous film has a porosity of 40 to 80% by volume, preferably 40 to 60% by volume, and a thickness of 20 to 150 μm.

When the PTFE microporous film is used as the microporous film, the nonwoven glass fiber fabric is placed on the negative electrode side to prevent contact of the PTFE microporous film with the negative electrode. Thereby, the fluorine atoms in PTFE do not react with the negative electrode metal such as lithium and the function of the separator is not deteriorated.

When the ETFE microporous film is used as the microporous film, since it does not react with the negative electrode metal, either of the ETFE microporous film and the nonwoven glass fiber fabric can be placed on the negative electrode side. Preferably, the nonwoven glass fiber fabric is placed on the negative electrode side since a larger amount of the electrolytic solution is present near the negative electrode and a discharge performance is improved in case of discharge under large current.

The nonwoven glass fiber fabric which constitutes the separator in the present invention has a porosity of 50 to 95% by weight, preferably 75 to 95% by weight, and a thickness of 100 to 500 μm.

In the present invention, since the separator comprises the microporous film and the nonwoven glass fiber fabric, and the positive and negative electrodes are effectively separated by the microporous film, the nonwoven glass fiber fabric having the larger porosity can be used, whereby the separator has larger electrolytic solution-retaining ability. If the organic binder in the nonwoven glass fiber fabric is dissolved in the electrolytic solution during storage and the strength of the nonwoven fabric is decreased, the electrodes are sufficiently separated by the microporous film. Therefore, the short circuits are not formed, and the electrolytic solution-retaining ability of the whole separator is kept larger than in case where the microporous film alone is used as the separator although the thinner parts of the nonwoven fabric have the decreased electrolytic solution-retaining ability.

Examples of the oxyhalide to be used in the cell of the present invention are thionyl chloride, sulfuryl chloride, phosphoryl chloride and mixtures thereof. The oxyhalide is the active material for positive electrode and serves as a solvent for electrolytic solution.

The electrolytic solution is prepared by dissolving an electrolyte such as $LiAlCl_4$, $LiAlBr_4$, $LiGaCl_4$, $LiB_{10}Cl_{10}$ in the oxyhalide. Alternatively, for example, LiCl and $AlCl_4$ are added to the oxyhalide to form $LiAlCl_4$ in the solution. $LiAlCl_4$ is present in the solution in the form of $Li^+$ ion and $AlCl_4^-$ ion.

Examples of the alkali metal to be used as the negative electrode are lithium, sodium and potassium.

The inorganic nonaqueous electrolytic solution type cell of the present invention is now explained in detail by making reference to the accompanying drawings.

Figure 2:
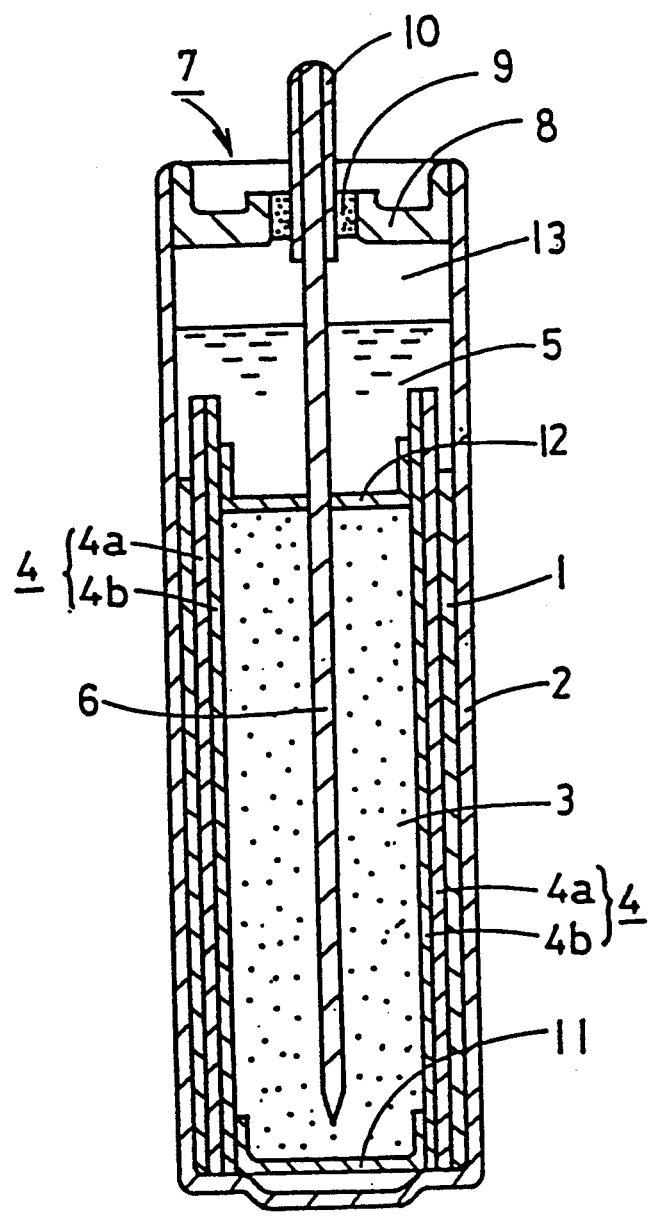
FIG. 2 is a cross section of an inorganic nonaqueous electrolytic solution type cell of the present invention.

FIG. 2 shows a cross section of one preferred embodiment of the inorganic nonaqueous electrolytic solution type cell of the present invention. The cell comprises a negative electrode 1 which is made of the alkali metal such as lithium, sodium and potassium, and is formed in a cylinder shape by pressing a sheet of the alkali metal against an inner wall of a stainless steel made cell container 2 having a bottom. A positive electrode 3 is made of a porous carbon molded article comprising acetylene black and a small amount of a binder such as polyethyl acrylate. Between the negative electrode 1 and the positive electrode 3, an separator 4 is interposed. The separator 4 consists of a sheet of nonwoven glass fiber fabric 4a and a microporous film 4b which has substantially uniform micropores passages of which curve. In this embodiment, the separator is in a cylindrical form, and the nonwoven glass fiber fabric sheet 4a faces the negative electrode 1 and the microporous film 4b faces the positive electrode 3 so as to separate the electrodes 1 and 3. The cell contains an electrolytic solution 5 comprising an oxyhalide such as thionyl chloride, sulfuryl chloride and phosphoryl chloride as a solvent for electrolyte. The electrolytic solution 5 is prepared by dissolving an electrolyte such as $LiAlCl_4$ in the oxyhalide. Since the active material for positive electrode, namely the oxyhalide, serves as the solvent for the electrolyte, a larger amount of the electrolytic solution 5 can be contained in the cell than in other cells. As the oxyhalide is the active material for positive electrode, the positive electrode 3 itself does not react, but provides a space where the oxyhalide and the alkali metal ions from the negative electrode react each other. The cell further comprises a collector electrode 6 made of nickel-steel for the positive electrode, and a cap 7 which has a body 8, a glass layer 9 and a positive electrode terminal 10. The body 8 is made of stainless steel and an upwardly standing outer periphery of the body is welded to an opening edge of the cell container 2. The glass layer 9 is positioned in the inner periphery of the body 8 and insulates the body 8 and the positive electrode terminal 10. The outer surface of the glass layer 9 is fusion bonded to the inner surface of the body 8, and the inner surface of the glass body 9 is fusion bonded to the outer surface of the positive electrode terminal 10 so as to seal the gap between the body 8 and the positive electrode terminal 8. The positive electrode terminal 10 is made of stainless steel and in a pipe form through which the electrolytic solution is poured in the cell interior during assembly of the cell. After pouring the electrolytic solution, the collector electrode 10 is inserted in the pipe form terminal 10 and the upper end part of the collector electrode is welded to the terminal to seal them. The cell further comprises bottom and top insulators 11 and 12. The bottom insulator 11 is made of a sheet of nonwoven glass fiber fabric and insulates the positive electrode 3 and the cell container which also serves as a collector electrode for the negative electrode. The top insulator 12 is also made of a sheet of nonwoven glass fiber fabric and insulate the positive electrode 3 and the body 8 of the cap 7. In the upper internal space of the cell, an air room 13 is left to absorb volume expansion of the electrolytic solution at high temperature.

In the cell of the present invention, the separator 4 consists of the nonwoven glass fiber fabric sheet 4a and the microporous film 4b which has micropores the passages of which curve, the decrease of closing voltage after long time storage is prevented and the formation of short circuits caused by vibration is suppressed.

PREFERRED EMBODIMENTS OF THE INVENTION

The present invention will be illustrated by following Examples.

EXAMPLE 1

An inorganic nonaqueous electrolytic solution type SUM3 cell of FIG. 2 was produced by using a laminate of a sheet of nonwoven glass fiber fabric having a porosity of 95% by volume and a thickness of 200 μm and an ETFE microporous film having a porosity of 60% by volume and a thickness of 40 μm as a separator, lithium as a negative electrode, thionyl chloride as an active material for positive electrode and a solution of $LiAlCl_4$ in thionyl chloride in a concentration of 1.2 mole/liter as an electrolytic solution with positioning the separator so that the nonwoven glass fiber fabric sheet faced the negative electrode and the ETFE microporous film faced the positive electrode. The nonwoven glass fiber fabric contained polyethyl acrylate as a binder.

The cell was assembled as follows:

Against the inner wall of the cell container 2 having the bottom, the lithium sheet was pressed to form the negative electrode 1. Along the inner surface of the negative electrode 1, the cylindrical nonwoven glass fiber fabric sheet 4a was placed, and then, along the inner surface of the fabric sheet 4a, the cylindrical ETFE microporous film 4b was placed to form the separator 4. Thereafter, the bottom insulator 11 was placed on the bottom of cell container 2, and the cylindrical positive electrode 3 was inserted inside the separator 4. On the positive electrode 3, the top insulator 12 was placed, and the cap 7 was engaged with the upper opening of the cell container 12. The outer periphery of the body 8 of the cap 7 was welded to the opening edge of the cell container 12. After poring the electrolytic solution through the pipe part of the cap 7, the collector electrode 6 of the positive electrode was inserted in the pipe part, and the lower end of the collector electrode 6 passed through the top insulator 12 and reached the interior of the positive electrode 3. Then, the upper part of the collector electrode 6 of the negative electrode was welded to the upper end of the pipe part to seal said part and to form the positive electrode terminal.

EXAMPLE 2

In the same manner as in Example 1 but using a composite of a sheet of nonwoven glass fiber fabric having the porosity of 95% by volume and the thickness of 200 μm and an ETFE microporous film having the porosity of 60% by volume and the thickness of 40 μm as the separator and facing the nonwoven glass fiber fabric to the positive electrode and the ETFE microporous film to the negative electrode, an inorganic nonaqueous electrolytic solution type electrode of FIG. 2 was produced.

EXAMPLE 3

In the same manner as in Example 1 but using a composite of a sheet of nonwoven glass fiber fabric having the porosity of 95% by volume and the thickness of 200 μm and a PTFE microporous film having the porosity of 70% by volume and the thickness of 25 μm as a separator, an inorganic nonaqueous electrolytic solution type electrode of FIG. 2 was produced.

COMPARATIVE EXAMPLE

In the same manner as in Example 1 but using a sheet of a nonwoven glass fiber fabric having the porosity of 95% by volume and the thickness of 200 μm and containing polyethyl acrylate as a binder, an inorganic nonaqueous electrolytic solution type electrode was produced.

The cell of Comparative Example had the cross section of FIG. 1 the structure of which was substantially the same as that of FIG. 2 except that the separator consisted of the nonwoven glass fiber fabric sheet alone.

Each of the cells produced in Examples 1, 2 and 3 and Comparative Example was stored at 60° C. for a predetermined period of time and the closing voltage was measured when the cell was discharged at 20° C., 100 ohms for 5 seconds. The relationship between the closing voltage and the storage time is shown in FIG. 3.

Figure 3:
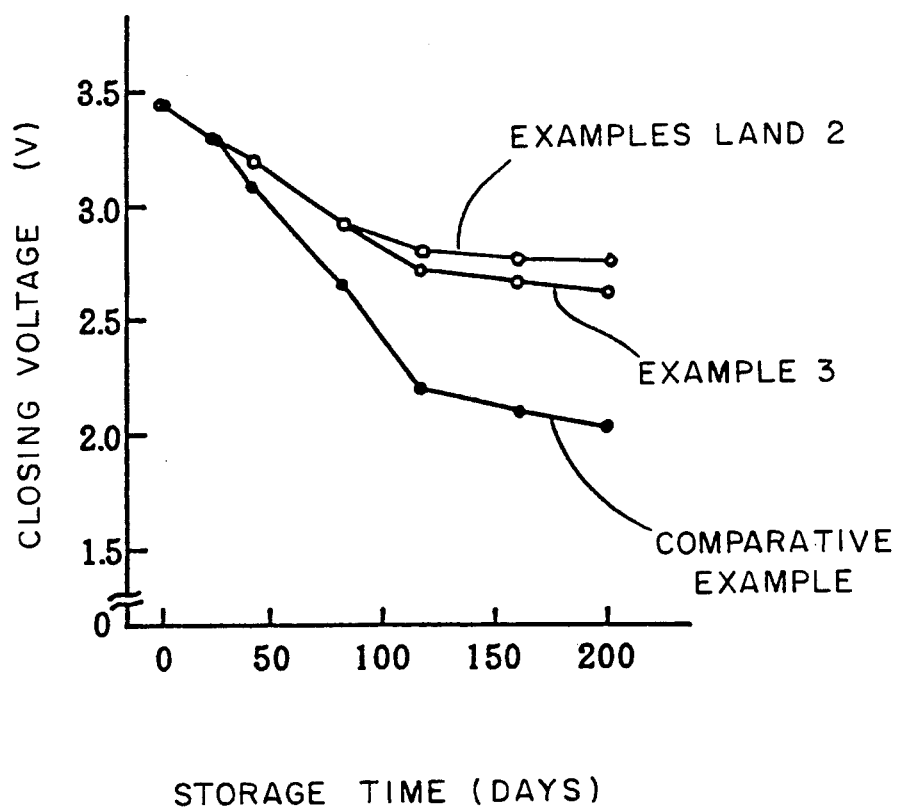
FIG. 3 is a graph showing relationships between the closing voltage and the storage time at 60° C. of the cells prepared in Examples 1, 2 and 3 and Comparative Example.

As seen from FIG. 3, the decrease of the closing voltage after storage of the cells produced in Examples 1, 2 and 3 was smaller than that of the cell produced in Comparative Example.

After storing the cells produced in Examples 1, 2 and 3 and Comparative Example at 60° C. for 200 days, they were vibrated for 1000 hours at 60° C. according to the Test Method C of JIS C 5025. Before and after vibration, the discharging time when the cell was continuously discharged at 300 ohm to the final voltage of 2.5V was measured. The results are shown in Table.

TABLE

| Example No. | Discharging time (hours) | |
|---|---|---|
| | Before vibration | After vibration |
| 1 | 160 | 160 |
| 2 | 160 | 160 |
| 3 | 160 | 160 |
| Comp. | 158 | 149 |

What is claimed is:

1. An inorganic nonaqueous electrolytic solution type cell comprising:
   an oxyhalide which is in the liquid state at room temperature and serves as an active material for a positive electrode and as a solvent for an electrolytic solution;
   a negative electrode made of an alkali metal;
   a positive electrode made of a porous carbon molded article; and
   a separator which is positioned between said negative electrode and said positive electrode and comprises a nonwoven fabric of glass fibers and a microporous film having a substantially uniform micropores having curved passages.

2. The inorganic nonaqueous electrolytic solution type cell according to claim 1, wherein the microporous film is made of a fluororesin.

3. The inorganic nonaqueous electrolytic solution type cell according to claim 1, wherein the fluororesin is one selected from the group consisting of homo- or co-polymers of tetrafluoroethylene.

4. The inorganic nonaqueous electrolytic solution type cell according to claim 2, wherein the fluororesin is a copolymer of ethylene and tetrafluoroethylene.

5. The inorganic nonaqueous electrolytic solution type cell according to claim 2, wherein the fluororesin is polytetrafluoroethylene.

6. The inorganic nonaqueous electrolytic solution type cell according to claim 1, wherein the separator is so positioned that the microporous film faces the positive electrode and the nonwoven glass fiber fabric faces the negative electrode.

7. The inorganic nonaqueous electrolytic solution type cell according to claim 1, wherein the microporous film has a porosity of 40 to 80% by volume.

8. The inorganic nonaqueous electrolytic solution type cell according to claim 1, wherein the nonwoven glass fiber fabric has a porosity of 50 to 95% by volume.

9. The inorganic nonaqueous electrolytic solution type cell according to claim 1, wherein the oxyhalide is a compound selected from the group consisting of thionyl chloride, sulfuryl chloride and phosphoryl chloride.

* * * * *